United States Patent
Takanashi et al.

(10) Patent No.: US 9,340,727 B2
(45) Date of Patent: May 17, 2016

(54) METHOD FOR PRODUCING COATED ALKALINE EARTH METAL SILICATE PHOSPHOR PARTICLES

(75) Inventors: Shoji Takanashi, Ichikawa (JP); Yuji Takatsuka, Ichikawa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 136 days.

(21) Appl. No.: 14/122,392

(22) PCT Filed: May 24, 2012

(86) PCT No.: PCT/JP2012/063315
§ 371 (c)(1),
(2), (4) Date: Feb. 11, 2014

(87) PCT Pub. No.: WO2012/165290
PCT Pub. Date: Dec. 6, 2012

(65) Prior Publication Data
US 2014/0161975 A1    Jun. 12, 2014

(30) Foreign Application Priority Data
May 30, 2011 (JP) .................................. 2011-120178

(51) Int. Cl.
B05D 7/00 (2006.01)
C09K 11/02 (2006.01)
C09K 11/77 (2006.01)

(52) U.S. Cl.
CPC ........... C09K 11/025 (2013.01); C09K 11/7734 (2013.01)

(58) Field of Classification Search
CPC .......................... C09K 11/025; C09K 11/7734
USPC .................................................. 427/69, 214
See application file for complete search history.

(56) References Cited

U.S. PATENT DOCUMENTS

| | | | | |
|---|---|---|---|---|
| 4,999,219 A | * | 3/1991 | Klinedinst et al. .............. | 427/69 |
| 5,051,277 A | * | 9/1991 | Sigai et al. ...................... | 427/69 |
| 5,695,685 A | * | 12/1997 | Chau ....................... | 252/301.4 R |
| 6,149,839 A | * | 11/2000 | Diaz et al. ............... | 252/301.4 F |
| 2006/0255713 A1 | * | 11/2006 | Kondo ................. | C09K 11/025 313/486 |
| 2007/0295116 A1 | * | 12/2007 | Le Mercier et al. ............ | 73/866 |

FOREIGN PATENT DOCUMENTS

| | | |
|---|---|---|
| JP | H10-195427 | 7/1998 |
| JP | 2000-26853 | 1/2000 |
| JP | 2000-303065 | 10/2000 |
| JP | 2003-226872 A1 | 8/2003 |
| JP | 2004-137482 A1 | 5/2004 |
| JP | 2010-144111 A1 | 7/2010 |
| JP | 2011-26535 A1 | 2/2011 |
| JP | 2011-231266 A1 | 11/2011 |

OTHER PUBLICATIONS

Zhuang et al., The improvement of moisture resistance and thermal stability of Ca3SiO4Cl2:Eu2+ phosphor coated with SiO2, Applied Surface Science, 257 (2011), p. 4350-4353.*
Barry, Fluorescence of Eu2+-Activated Phases in Binary Alkaline Earth Orthosilicate Systems, J. Electrochem. Soc.: Solid State Science, Nov. 1968, p. 1181-1184.*
International Search Report for International Application No. PCT/JP2012/063315 dated Jun. 26, 2012.

* cited by examiner

*Primary Examiner* — Tabatha Penny
(74) *Attorney, Agent, or Firm* — Kratz, Quintos & Hanson, LLP

(57) ABSTRACT

A method for producing film-coated alkaline-earth metal silicate phosphor particles that can have improved light-emitting characteristics may include a coating film having high moisture resistance. Strontium-containing alkaline-earth metal silicate phosphor particles are pretreated with an alkaline-earth metal compound solution whose strontium compound concentration is 1 to 15% by mass with respect to the phosphor particles and whose pH is 6 or higher but 10 or lower. Then, a base layer of an aluminum organic metal compound is formed on the surface of the pretreated phosphor particles. Then, the phosphor particles are coated with a coating material composed of a partially-hydrolyzed condensate of a silane organic metal compound, and are then dried and heat-treated to form, on their surface, a coating film made of an amorphous inorganic compound mainly containing Si and O.

6 Claims, No Drawings

METHOD FOR PRODUCING COATED ALKALINE EARTH METAL SILICATE PHOSPHOR PARTICLES

TECHNICAL FIELD

The present invention relates to a method for producing film-coated alkaline-earth metal silicate phosphor particles for use in light-emitting devices such as LEDs. More specifically, the present invention relates to a method for efficiently producing film-coated alkaline-earth metal silicate phosphor particles having improved light-emitting characteristics and very high moisture resistance and water resistance by coating treatment.

BACKGROUND ART

Examples of an alkaline-earth metal silicate phosphor well known as a phosphor material for white LEDs include a yellow-emitting phosphor having a compound phase represented by a compositional formula, $Sr_3SiO_5$:Eu, (Sr, Ba)$_3SiO_5$:Eu, or (Sr, Ba, Ca)$_3SiO_5$:Eu, a green-emitting phosphor having a compound phase represented by a compositional formula, (Ba, Sr)$_2SiO_4$:Eu or (Ba, Sr, Ca)$_2SiO_4$:Eu, and an orange- to red-emitting phosphor having a compound phase represented by a compositional formula, (Sr, Ca)$_2SiO_4$:Eu or (Sr, Ca, Mg)$_2SiO_4$:Eu.

These strontium (Sr)-containing alkaline-earth metal silicate phosphors are used for high-brightness or high-color-rendering white LED devices, and absorb part of exciting light from a blue LED and emit yellow light, green light, and orange to red light, respectively. Further, neutral white light or warm white light can be more efficiently obtained by mixing blue exciting light and yellow light, blue exciting light, green light, and orange-to-red light, or blue exciting light, yellow light, and orange-to-red light.

Currently, LED devices are used for various purposes such as lighting, in-car lights, and backlights for liquid crystal display televisions. LED devices used for such purposes are mainly required to have high brightness and high chromaticity, and particularly, there has recently been a demand for LED devices having higher brightness. The properties of such LED devices depend on phosphors. In order to increase the brightness of LED devices, phosphors are required to have improved light-emitting characteristics. The same applies to the above-described silicate phosphors that emit yellow, green, or orange-to-red light. However, it is not easy to improve the light-emitting characteristics of phosphors themselves, and therefore various studies have been made to improve the characteristics of phosphors.

Meanwhile, it is known that an alkaline-earth metal silicate phosphor that emits yellow, green, or orange-to-red light is degraded by formation of a hydrate or a carbonate on the surface of particles of the phosphor because an alkaline-earth metal component, such as strontium, that is a constituent element of the phosphor is eluted from the inside of the particles with water vapor in air or water. Due to such properties, the silicate phosphor that emits yellow, green, or orange-to-red light has a problem that the silicate phosphor is degraded due to long-term use in the atmosphere or temperature rise caused by exciting light so that a brightness reduction and a color change occur.

It is an important issue to be resolved for current silicate phosphors for LEDs to overcome both the above-described problems, that is, to improve light-emitting characteristics and to prevent degradation by moisture. As one of measures against the issue, a method for modifying or coating the surface of silicate phosphor particles has been proposed. For example, Patent Literature 1 discloses, as a method for chemically modifying the surface composition of phosphor particles, a method in which cations on the surface of phosphor particles are replaced with selected cations by an ion-exchange reaction. Patent Literature 1 states that a phosphor obtained by this method can have improved adhesion and an improved lumen maintenance factor and can prevent the deposition of impurities.

More specifically, a layer is formed on the surface of phosphor particles by replacing cations of a phosphor material with other cations selected from aluminum, barium, calcium, lanthanum, magnesium, strontium, yttrium, zinc, titanium, tantalum, boron, and silicon. This method is simple but has not led to a significant improvement in water resistance or moisture resistance. Further, the most serious problem of this method is that when an obtained silicate phosphor poor in water resistance is introduced into a solution, an alkaline-earth metal as a constituent element of the phosphor is eluted from the inside of particles of the phosphor so that the phosphor is degraded and its light-emitting characteristics are deteriorated.

Further, Patent Literature 2 discloses a method for producing coated silicate phosphor particles, in which a silicate phosphor for fluorescent lamps is introduced into a solution containing a barium salt or a strontium salt, the solution is stirred to bind the salt to the surface of the phosphor, and then the silicate phosphor is heat-treated. More specifically, a considerable amount of a silicate phosphor is added to a cation-containing solution of a barium salt or a strontium salt and is then heat-treated to obtain a surface-treated phosphor.

This method is also simple, but has a problem in that an object to be coated is limited to $BaSi_2O_5$:Pb that has relatively high water resistance. Further, there is also a problem that surface treatment is performed simply by binding the salt to the surface of the particles, and therefore a resulting coating film is not dense and is poor in water resistance or moisture resistance. Further, the heat treatment is performed at a high temperature of 700 to 1000° C., and therefore when this treatment is applied to a silicate phosphor, light-emitting characteristics are significantly deteriorated due to thermal degradation. Further, this treatment has a significant impact on silicate phosphor particles depending on the type of salt used, and various problems such as acceleration of elution arise.

In order to solve the above problems, as disclosed in Patent Literature 3, the present inventors have proposed a method for obtaining film-coated phosphor particles, in which an aluminum organic compound layer is formed as a base layer on the surface of particles of a phosphor for LEDs, a coating material layer made of a partially-hydrolyzed condensate of a silane organic metal compound (hereinafter, referred to as a "hydrolysis condensate") is formed on the base layer, and then the phosphor particles are heat-treated at 200 to 400° C. in the atmosphere.

According to this method, it is possible to obtain phosphor particles having excellent moisture resistance and water resistance, because the aluminum organic compound previously formed as a base layer acts as a water protective film and therefore degradation caused by moisture can be prevented during the formation of the coating material layer on the base layer. However, the fact is that the other of the above problems has not yet been resolved, that is, formation of the coating film has not led to an improvement in the light-emitting characteristics of the phosphor itself.

CITATION LIST

Patent Literatures

Patent Literature 1: JP 10-195427 A
Patent Literature 2: JP 2000-026853 A
Patent Literature 3: JP 2011-026535 A

SUMMARY OF INVENTION

Technical Problem

In view of the above problems of the conventional art, it is an object of the present invention to provide a method for efficiently producing film-coated alkaline-earth metal silicate phosphor particles by simple coating treatment of the surface of phosphor particles so that the phosphor particles can have improved light-emitting characteristics and a coating film having very high moisture resistance and water resistance.

Solution to Problem

In order to achieve the above object, the present inventors have intensively studied a method for efficiently producing alkaline-earth metal silicate phosphor particles having improved light-emitting characteristics and a coating film having very high moisture resistance and water resistance by coating treatment. As a result, the present inventors have found that a modification of the method disclosed in Patent Literature 3 is very effective, in which alkaline-earth metal silicate phosphor particles are pretreated with a strontium compound-containing solution, and then an aluminum organic metal compound is adsorbed to the surface of the phosphor particles, and further the phosphor particles are coated with a coating material made of a partially-hydrolyzed condensate of a silane organic metal compound. This finding has led to the completion of the present invention.

More specifically, the present invention provides a method for producing film-coated alkaline-earth metal silicate phosphor particles having, on their surface, a coating film made of an amorphous inorganic compound mainly containing Si and O, the method including: forming a base layer of an aluminum organic metal compound on a surface of strontium-containing alkaline-earth metal silicate phosphor particles; coating the particles with a coating material made of a partially-hydrolyzed condensate of a silane organic metal compound; and drying and heat-treating resulting phosphor particles, wherein before the base layer is formed, the alkaline-earth metal silicate phosphor particles are pretreated with an alkaline-earth metal compound solution containing at least 1 to 15% by mass of a strontium compound with respect to the phosphor particles and having a pH of 6 or higher but 10 or lower.

In the method for producing film-coated alkaline-earth metal silicate phosphor particles according to the present invention, the strontium compound contained in the alkaline-earth metal compound solution is preferably at least one selected from strontium acetate and strontium chloride. Further, the pretreatment is preferably performed by adding and mixing the alkaline-earth metal silicate phosphor particles to and with the alkaline-earth metal compound solution at a temperature of 18 to 60° C. for 1 to 24 hours.

Advantageous Effects of Invention

According to the present invention, it is possible to form a coating film having very high moisture resistance and water resistance on the surface of alkaline-earth metal silicate phosphor particles containing strontium by a simple and efficient wet method, and in addition, it is possible to achieve an improvement in light-emitting characteristics that has not previously been achieved.

DESCRIPTION OF EMBODIMENTS

The present invention provides a method for producing film-coated alkaline-earth metal silicate phosphor particles, and the method includes: a pretreatment step in which particles of a strontium-containing alkaline-earth metal silicate phosphor are added to an alkaline-earth metal compound solution containing a strontium compound with stirring; a base layer-forming step in which an aluminum organic metal compound is adsorbed to the phosphor particles to form a base layer; a coating layer-forming step in which the phosphor particles are coated with a coating material composed of a partially-hydrolyzed condensate of a silane organic metal compound; and a heat treatment step in which the phosphor particles coated with the coating material are dried and heat-treated to form a coating film.

The base layer-forming step, the coating layer-forming step, and the heat treatment step are steps performed in the above-described method disclosed in Patent Literature 3 to significantly improve the moisture resistance and water resistance of resulting film-coated alkaline-earth metal silicate phosphor particles. The method according to the present invention further includes the above-described pretreatment step to coat the surface of particles of a phosphor with a pretreatment film of an alkaline-earth metal compound containing a strontium compound. This makes it possible to suppress the elution of a phosphor component in the subsequent base layer-forming step and coating layer-forming step and to cover the loss of strontium. Further, it has been surprisingly found that the pretreatment step improves the light-emitting characteristics of the phosphor.

More specifically, the study by the present inventors has revealed the following. When the surface portion of a particle of a strontium-containing alkaline-earth metal silicate phosphor with a coating film formed by the above-described method disclosed in Patent Literature 1 was observed with cross-section TEM, the phosphor particle was abnormal in its surface portion just below the coating film, that is, a heterogenous phase was observed which had a width of about 5 nm in the depth direction of the particle from the surface of the particle. Usually, the inner portion of the particle has a single phase, and therefore its crystal orientation is unidirectional. However, the heterogenous phase portion has a random crystal orientation, from which it can be judged that the heterogenous phase portion has a different crystalline structure. Further, when the heterogenous phase portion was analyzed by TEM-EDS, the amount of strontium in the heterogenous phase portion was smaller than that in the inner portion of the particle, which has been found to be the cause of a change in the structure of the phosphor.

That is, in the above-described coating treatment, phosphor particles are dispersed in an alcohol solvent, and then a metal alkoxide and water for hydrolysis reaction are added thereto. It is considered that at this time, the surface of the phosphor particles is exposed to moisture present as an impurity in the solvent or moisture for hydrolysis, and therefore a phosphor component is eluted from the surface of the phosphor particles so that the phosphor particles are degraded. The phosphor component eluted from the surface of the phosphor particles is an alkaline-earth metal, and especially, strontium or calcium is more likely to be eluted than barium. That is, a phosphor containing a larger amount of strontium or calcium is more likely to be degraded by moisture. More specifically, it is known that $Sr_3SiO_5$ is more likely to be degraded by moisture than $(Sr, Ba)_3SiO_5$ and that $(Ba, Sr)_2SiO_4$ is more likely to be degraded by moisture than $Ba_2SiO_4$.

As can be seen from the above findings, it is important for stabilizing the light-emitting characteristics of phosphor particles before and after coating treatment to suppress the elution of an alkaline-earth metal element from the surface of the phosphor particles or to supply an element eluted from the surface of the phosphor particles during coating treatment. Further, the study by the present inventors has found that such suppression of elution of an alkaline-earth metal element or supply of an element eluted during coating treatment is effectively achieved by previously forming a film containing at least a strontium compound on the surface of phosphor particles by using an aqueous alkaline-earth metal compound solution containing at least a strontium compound. It is to be noted that the reason why light-emitting characteristics are improved by forming an alkaline-earth metal compound film containing at least a strontium compound is not yet understood.

(1) Strontium-Containing Alkaline-Earth Metal Silicate Phosphor

Examples of a yellow-emitting silicate phosphor for use in LEDs include $Sr_3SiO_5$:Eu, $(Sr, Ba)_3SiO_5$:Eu, and $(Sr, Ba, Ca)_3SiO_5$:Eu, examples of a green-emitting silicate phosphor for use in LEDs include $(Ba, Sr)_2SiO_4$:Eu and $(Ba, Sr, Ca)_2SiO_4$:Eu, and examples of an orange- to red-emitting silicate phosphor for use in LEDs include $(Sr, Ca)_2SiO_4$:Eu and $(Sr, Ca, Mg)_2SiO_4$:Eu.

Emission spectra obtained by exciting these phosphors with light having a wavelength of 430 nm or more but 470 nm or less have an emission peak in a wavelength range of 520 nm or more but 620 nm or less. Preferably, the yellow-emitting silicate phosphors have an emission peak in a wavelength range of 560 nm or more but 590 nm or less, the green-emitting silicate phosphors have an emission peak in a wavelength range of 520 nm or more but 540 nm or less, and the orange- to red-emitting silicate phosphors have an emission peak in a wavelength range of 600 nm or more but 620 nm or less. The composition ratio of Eu as an activator with respect to the alkaline-earth metal is preferably 5 to 20 mol %, because if the composition ratio of Eu is less than 5 mol %, emission brightness is reduced, and if the composition ratio of Eu exceeds 20 mol %, sufficient emission brightness cannot be obtained due to concentration quenching.

The strontium-containing alkaline-earth metal silicate phosphor to be used in the present invention shall be any one of the above-described $Sr_3SiO_5$:Eu, $(Sr, Ba)_2SiO_5$:Eu, $(Sr, Ba, Ca)_3SiO_5$:Eu, $(Ba, Sr)_2SiO_4$:Eu, $(Ba, Sr, Ca)_2SiO_4$:Eu, $(Sr, Ca)_2SiO_4$:Eu, and $(Sr, Ca, Mg)_2SiO_4$:Eu, and may be commercially-available one. It is to be noted that these phosphors can be produced by a solid-phase method disclosed in JP 2006-036943 A or another well-known production method.

It is to be noted that the orange- to red-emitting phosphors $(Sr, Ca)_2SiO_4$:Eu and $(Sr, Ca, Mg)_2SiO_4$:Eu are alkaline-earth metal silicate phosphors that emit light at 600 nm or more, and an orange- to red-emitting alkaline-earth metal silicate phosphor represented by the following formula (I) can be produced by the following production method.

$$(Sr_aCa_bMg_cEu_d)_2Si_eO_4 \qquad \text{Formula (I)}$$

wherein $0<a<0.7$, $0<b<0.7$, $0\leq c<0.5$, $0.012\leq d<0.2$, and $0.8\leq e\leq 1.5$ The orange- to red-emitting alkaline-earth metal silicate phosphor can be produced in the following manner. $SrCO_3$, $CaCO_3$, $SiO_2$, and $Eu_2O_3$ as starting materials are weighed to achieve a predetermined composition, dispersed in water or an alcohol, and dried to obtain a precursor, and the precursor is preliminarily fired, further mixed with flux, and subjected to reduction firing under a weak reductive atmosphere to remove the flux. Further, the precursor is more preferably obtained by a solution technique using a water-soluble silicon compound (hereinafter, sometimes referred to as "WSS") instead of $SiO_2$, because a phosphor in which constituent elements are uniformly distributed can be obtained.

The starting materials are not particularly limited as long as they can be solved in a solvent, and oxides, hydroxides, acetates, nitrates, carbonates, and sulfates can be used. The water-soluble silicon compound (WSS) is formed by adding hydrochloric acid and water to a mixed liquid of tetraethoxysilane (TEOS) and propylene glycol. More specifically, 22.4 mL of TEOS and 22.4 mL of propylene glycol (99%) were weighed and mixed at 80° C. for 48 hours, and then 100 μL of hydrochloric acid is added to the mixed liquid and stirred at room temperature for 1 hour. Then, distilled water is added to the stirred liquid to give a total volume of 100 mL to obtain a 1 M water-soluble silicon compound solution.

A mixed liquid of these raw materials is placed in a vessel and heated to allow the polymerization reaction of the silicon compound to proceed to form a silicon-containing gel in which metal elements are uniformly dispersed. The silicon-containing gel is dried to obtain a precursor, and the precursor is preliminarily fired, further mixed with flux such as strontium chloride or barium chloride, and subjected to reduction firing to obtain alkaline-earth metal silicate phosphor particles that emit orange to red light with high brightness.

(2) Strontium Compound-Containing Alkaline-Earth Metal Compound Solution for Use in Pretreatment The strontium compound contained in the alkaline-earth metal compound solution is not particularly limited as long as the strontium compound is soluble in water, but strontium acetate and strontium chloride are suitably used because their acidity is not high and therefore phosphor particles are hardly degraded.

Particularly, strontium acetate is preferred, because its aqueous solution has a pH of 6 to 7 and therefore the surface of phosphor particles is not degraded by acid, and strontium acetate is highly adsorptive to the surface of phosphor particles due to the influence of acetate ions and therefore a film is easily formed. On the other hand, strontium chloride has a slightly high acidity and its aqueous solution has an acidic pH of 3 to 4. However, strontium chloride can be more suitably used by, for example, adding ammonia water to adjust the pH to 6 or higher but 10 or lower, preferably 6 or higher but 7 or lower.

As will be described later, the alkaline-earth metal compound solution may contain an alkaline-earth metal compound other than the strontium compound, but the concentration of the strontium compound in the solution shall be in the range of 1 to 15% by mass with respect to phosphor particles to be treated. If the concentration of the strontium compound is less than 1% by mass with respect to phosphor particles, the above-described effect of the present invention, that is, the effect of preventing the degradation of a phosphor due to the elution of an alkaline-earth metal element such as strontium to improve light-emitting characteristics cannot be obtained. Further, the degree of solubility of the strontium compound in water is not so high, and therefore the amount of the strontium compound to be added shall be up to 15% by mass with respect to phosphor particles.

When an alkaline-earth metal silicate phosphor to be subjected to coating treatment contains an alkaline-earth metal other than strontium, one or more of a barium compound and a calcium compound may be added to the above-described strontium compound-containing alkaline-earth metal compound solution.

The barium compound is preferably barium acetate or barium chloride. Further, calcium acetate or calcium chloride can be suitably used as the calcium compound. The total amount of the strontium compound, the barium compound, and the calcium compound to be added shall be in the range of 2 to 20% by mass with respect to phosphor particles. However, some types of compounds have a high acidity. For example, when the pH of the solution is made lower than 6 by adding barium chloride, the pH of the solution shall be adjusted to 6 or higher but 10 or lower, preferably 6 or higher but 7 or lower by adding ammonium water.

Further, an aluminum organic metal compound may be added as a film-forming material to the above-described alkaline-earth metal compound solution. The aluminum organic metal compound to be added may be appropriately selected from aluminum organic metal compounds to be used in the base layer-forming step that will be described later. The concentration of the aluminum organic metal compound in the alkaline-earth metal compound solution is preferably in the range of 20 to 100% by mass with respect to phosphor particles. It is to be noted that even when previously adjusted to be within a preferred range of 6 or higher but 7 or lower, the pH of the alkaline-earth metal compound solution is shifted to the alkaline side by adding the aluminum organic metal compound, but the aluminum organic metal compound can be used without any problem unless the alkaline-earth metal compound solution is made acidic.

(3) Pretreatment of Alkaline-Earth Metal Silicate Phosphor with Alkaline-Earth Metal Compound Solution In the pretreatment step, particles of an alkaline-earth metal silicate phosphor are added to and mixed with the above-described strontium compound-containing alkaline-earth metal compound solution with stirring to perform pretreatment. The pretreatment is preferably performed by mixing with stirring under the conditions of a temperature of 18° C. to 60° C. and a time of 1 hour to 24 hours. If the temperature of the pretreatment is lower than 18° C. or the time of the pretreatment is shorter than 1 hour, the effect of the pretreatment cannot be sufficiently obtained. Further, if the temperature of the pretreatment exceeds 60° C., elution from the surface of the phosphor is likely to be promoted so that the phosphor is degraded and its light-emitting characteristics are deteriorated, which is disadvantageous. Even if the time of the pretreatment exceeds 24 hours, the effect of the pretreatment is not further enhanced, and in addition, the phosphor is degraded due to long-time immersion in the solution so that its light-emitting characteristics are deteriorated, which is also disadvantageous.

The effect of adding a strontium compound is to form a layer containing the strontium compound on the surface of phosphor particles to improve light-emitting characteristics. By a simple method in which alkaline-earth metal silicate phosphor particles are stirred in an alkaline-earth metal compound solution containing a strontium compound, a pretreatment layer containing the strontium compound is formed on the surface of the phosphor particles after filtration. These phosphor particles are dried and heat-treated. The internal quantum efficiency of the thus obtained phosphor particles was measured, and as a result, it was confirmed that the internal quantum efficiency was increased by about 2 to 5%, that is, the light-emitting characteristics of the phosphor were improved.

Further, also when the pretreatment is performed using an alkaline-earth metal compound solution containing a barium compound or a calcium compound besides a strontium compound or containing an aluminum organic metal compound, a mixed layer of the alkaline-earth metal compounds or a mixed layer of the alkaline-earth metal compound and the aluminum organic metal compound can be formed on the surface of particles of a phosphor. As a result, the elution of a component(s) of the phosphor can be suppressed and the loss of the component (s) is covered to maintain preferred surface conditions, which contributes to improved light-emitting characteristics.

The above-described pretreatment step can improve the light-emitting characteristics of an alkaline-earth metal silicate phosphor, but sufficient water and moisture resistance cannot be obtained only by forming a pretreatment layer (first layer) of a strontium compound-containing alkaline-earth metal compound. Therefore, according to the above-described method disclosed in Patent Literature 3, a base layer of an aluminum organic metal compound is formed as a second layer (base layer-forming step), and a coating material layer made of a partially-hydrolyzed condensate of a silane organic metal compound is laminated as a third layer (coating material layer-forming step), and then heat treatment is performed (heat treatment step). In this way, film-coated alkaline-earth metal silicate phosphor particles can be obtained which are excellent in light-emitting characteristics, water resistance, and moisture resistance.

(4) Steps for Producing Film-Coated Alkaline-Earth Metal Silicate Phosphor Particles after Pretreatment Step (4-1 Base Layer-Forming Step)

In the base layer-forming step, an aluminum organic metal compound is adsorbed to the surface of phosphor particles pretreated in such a manner as described above to form phosphor particles having a uniform base layer. In the subsequent coating material layer-forming step, a silane organic metal compound, a catalyst, and water are blended and mixed with stirring under hermetically sealed conditions to prepare a coating material composed of a hydrolysis condensate, and the coating material is added to and mixed with an organic solvent, in which the phosphor particles having a base layer are again dispersed, with stirring to obtain phosphor particles coated with the coating material. Then, the phosphor particles are subjected to heat treatment to obtain film-coated alkaline-earth metal silicate phosphor particles.

More specifically, in the above-described base layer-forming step, first, an aluminum organic metal compound and tetraethoxysilane (TEOS) are mixed in an organic solvent, the temperature of the mixture is controlled to 18 to 40° C. under hermetically sealed conditions, and 5 to 30% by mass of pure water with respect to a phosphor to be added is dropped thereto and mixed with stirring for 2 to 10 hours to obtain a partially-hydrolyzed aluminum organic metal compound (a). Then, phosphor particles pretreated in such a manner as described above are added to an organic solvent, and the partially-hydrolyzed aluminum organic metal compound (a) is added thereto and mixed with stirring for 2 to 18 hours under hermetically sealed conditions. Then, the mixture is subjected to vacuum filtration to separate a solid from the organic solvent, and the solid is dried to obtain phosphor particles (A) having a base layer of the aluminum organic metal compound formed on their surface.

The aluminum organic metal compound is not particularly limited, but is preferably one compatible with an alcohol represented by the general formula: ROH (wherein R is a monovalent hydrocarbon group having 1 to 6 carbon atoms) and highly adsorptive to the surface of phosphor particles. Specific preferred examples of such an aluminum organic metal compound include alkyl group-containing aluminum chelate compounds such as ethylacetoacetate aluminum diisopropylate, aluminum tris(ethylacetoacetate), octylacetoacetate aluminum diisopropylate, and aluminum monoacetylacetonato bis(ethylacetoacetate). Among them, ethylacetoacetate aluminum diisopropylate is more preferred which is highly compatible with ethanol and isopropyl alcohol.

(4-2 Coating Material Layer-Forming Step)

In the next coating material layer-forming step, first, an organic solvent, a silane organic metal compound, an aluminum organic metal compound acting as a catalyst, and water for hydrolysis are placed in a stirrer-equipped hermetic vessel and are then mixed with stirring at 18 to 40° C. for 18 to 96 hours under hermetically sealed conditions to obtain a hydrolysis condensate of the silane organic metal compound (b). Then, the hydrolysis condensate (b) is stirred in an open vessel while maintained at a temperature of 12 to 30° C. so as to be concentrated to obtain a coating material liquid (c) whose mass is 80 to 70% of the initial mass of the hydrolysis condensate (b).

The silane organic metal compound is not particularly limited, but trialkoxysilane is preferred from the viewpoint of stability during preparation of the coating material liquid (c) composed of a hydrolysis condensate, coatability, and film quality. Specific examples of the trialkoxysilane that can be suitably used include methyl-, ethyl-, i-propyl-, i-butyl-, n-propyl-, and n-butyl-trialkoxysilanes. Among them, methyl triethoxysilane, methyl trimethoxysilane, ethyl trimethoxysilane, ethyl triethoxysilane, or n-propyl trimethoxysilane is more preferred, and methyl trimethoxysilane or methyl triethoxysilane is even more preferred.

Then, the phosphor particles (A) having a base layer and the coating material liquid (c) containing the hydrolysis condensate (b) are mixed in a mass ratio of 1:2 to 50, and if necessary, they are mixed with an organic solvent. The mixture is again dispersed by ultrasonic vibration. Further, the mixture is mixed with stirring at a temperature of 18 to 60° for 0.2 to 5 hours under hermetically sealed conditions, if necessary, and is then subjected to vacuum filtration to obtain phosphor particles (B) having a coating material layer formed on the surface thereof.

(4-3 Heat Treatment Step)

In the last heat treatment step, the phosphor particles (B) having a coating material layer formed in such a manner as described above are dried, and are then subjected to heat treatment at a temperature of 100 to 350° C. for 0.5 to 18 hours under the atmosphere. As a result of the heat treatment, the layers from the pretreatment layer as a first layer to the coating material layer as a third layer are integrated to form a coating film so that a film-coated alkaline-earth metal silicate phosphor according to the present invention can be obtained.

The obtained film-coated alkaline-earth metal silicate phosphor according to the present invention includes an alkaline-earth metal silicate phosphor particle as a core material and a coating film made of an amorphous inorganic compound mainly containing Si and O and formed on the surface of the alkaline-earth metal silicate phosphor particle. The film-coated alkaline-earth metal silicate phosphor has not only very high moisture and water resistance but also light-emitting characteristics superior to those of the alkaline-earth metal silicate phosphor particle as a core material. The thickness of the coating film is preferably in the range of 5 to 100 nm. The coating film is made of a very transparent amorphous inorganic oxide, and therefore the emission intensity of the phosphor particle is not impaired by the coating film provided on the surface of the phosphor particle.

EXAMPLE

Hereinbelow, the present invention will be described in more detail with reference to Example and Comparative Example. It is to be noted that in these Example and Comparative Example, light-emitting characteristics, water resistance (conductivity change), moisture resistance, and the thickness of a pretreatment film or a coating film were evaluated by the following methods.

(1) In order to investigate light-emitting characteristics before and after forming a coating film, absorptance (Abs.), external quantum efficiency (EQE), and internal quantum efficiency (IQE) were measured by PL (Photo Luminescence) before and after coating, and their values after coating were determined as values relative to their values before coating (light-emitting characteristics after coating/light-emitting characteristics before coating). Comparison of light-emitting characteristics was made before and after coating treatment to assess degradation during coating treatment or effect of forming a coating film based on a decrease or increase in value. It is to be noted that light-emitting characteristics were determined upon excitation at 450 nm using a spectrofluorophotometer FP6500 manufactured by JASCO Corporation.

(2) Water resistance was evaluated based on a change in electric conductivity determined by introducing phosphor particles into water. That is, in the case of phosphor particles poor in water resistance, their component(s) is (are) eluted into water from their surface so that electric conductivity increases with immersion time. More specifically, 0.1 g of phosphor particles was introduced into 100 mL of hot water at 25° C. and stirred for 10 minutes, and then a change in electric conductivity was measured.

(3) Moisture resistance was evaluated by measuring the PL intensity of phosphor particles before and after a moisture resistance test and determining a change in PL intensity before and after coating as a relative value (PL intensity after moisture resistance test/initial PL intensity). The moisture resistance test was performed as follows: 10% by mass of phosphor particles were added to and mixed with a silicone resin, and after curing, the silicone resin was maintained in an atmosphere of 85° C.×85% RH for 250 hours.

(4) The thicknesses of a pretreatment film and a coating film were determined in the following manner: phosphor particles were embedded in an epoxy resin, and after the epoxy resin was cured, the cross section of the epoxy resin was processed and observed by TEM to obtain an image, and the thickness of the coating film (number of samples: n=5) was measured from the image to determine the average film thickness of the entire coating film.

In this Example, an organic solvent was used after moisture was removed by introducing 500 g of a previously-dried molecular sieve (3A) into 10 liters of the organic solvent. It is to be noted that the amount of moisture contained in ethanol and IPA used was 0.1 g/L as measured by a Karl Fischer's moisture meter.

Further, a coating material solution used in this Example was prepared in the following manner. To 100 g of methyl trimethoxysilane (Z-6366 manufactured by Dow Corning Toray Co., Ltd.), 68 g of ethanol (manufactured by KANTO CHEMICAL CO., INC., special grade chemical), 2.5 g of ethylacetoacetate aluminum diisopropylate (manufactured by Kawaken Fine Chemicals Co., Ltd., ALCH S75P: concentration 75 mass %), and 32 g of ion-exchanged water were added, and the mixture was mixed with vigorous stirring by a stirrer while maintained at a temperature of 25° C. After a lapse of 72 hours, an organic solution containing a hydrolysis condensate of the silane organic metal compound was obtained. One hundred grams of this solution was taken out and placed in an open bottle, and was continued to stir at room temperature for concentration until the mass of the solution was reduced by 25% to volatilize unnecessary moisture, the solvent, and the unreacted silane compound contained in the solution. The thus obtained solution was taken out of the bottle and used as a coating material solution.

EXAMPLE

First, an alkaline-earth metal silicate phosphor was pretreated using various strontium compound-containing aqueous alkaline-earth metal compound solutions shown below to prepare various phosphor particles having a pretreatment film as Samples 1 to 14. Then, the effect of the pretreatment film on improving the light-emitting characteristics of the phosphor particles of each of Samples was investigated.

(Samples 1 to 4)

Strontium acetate (manufactured by KANTO CHEMICAL CO., INC., special grade chemical) as a strontium compound was added to and dissolved in pure water with stirring to prepare four kinds of aqueous solutions whose strontium compound concentrations were 2, 10, 15, and 20% by mass, respectively. These aqueous solutions had a pH of 7.1, 6.6, 6.2, and 6.0, respectively.

As a pretreatment solution, 100 g of each of the aqueous solutions was sampled, and 10 g of $Sr_3SiO_5$:Eu particles (SSE: manufactured by TOKYO KAGAKU KENKYUSHO CO., LTD., D50=19 μm) as phosphor particles was added to the pretreatment solution and stirred at a temperature of 23° C. for 2 hours. After the completion of stirring, the mixture was subjected to vacuum filtration to obtain phosphor particles having a pretreatment film of a Sr compound formed on their surface. In this way, phosphor particles of Samples 1 to 4 having a pretreatment film of a Sr compound were obtained.

(Samples 5 and 6)

Phosphor particles of Samples 5 and 6 having a pretreatment film of a Sr compound formed on their surface were obtained in the same manner as in the case of Sample 1 except that $(Sr_{0.95}, Ba_{0.05})_3SiO_5$:Eu particles (SBSE: manufactured by TOKYO KAGAKU KENKYUSHO CO., LTD., D50=22 μm) were used as phosphor particles and that an aqueous solution containing strontium acetate and barium chloride in a total amount of 10% by mass and in a ratio of 9:1 (Sample 5) or 1:9 (Sample 6) was prepared.

(Samples 7 and 8)

Phosphor particles of Samples 7 and 8 having a pretreatment film of a Sr compound formed on their surface were obtained in the same manner as in the case of Sample 1 except that $(Ba_{0.65}, Sr_{0.35})_2SiO_4$:Eu particles (BSSE: manufactured by SUMITOMO METAL MINING CO., LTD., D50=27 μm) were used as phosphor particles and that an aqueous strontium acetate solution with a concentration of 10% by mass and an aqueous strontium chloride solution with a concentration of 10% by mass were used for Sample 7 and Sample 8, respectively.

(Sample 9)

One hundred grams of strontium acetate (manufactured by KANTO CHEMICAL CO., INC., special grade chemical) was added to and dissolved in 900 g of pure water with stirring to prepare an aqueous strontium acetate solution with a concentration of 10% by mass. Two hundred grams of an IPA solvent was placed in another vessel, and 10 g of ethylacetoacetate aluminum diisopropylate (manufactured by Kawaken Fine Chemicals Co., Ltd., ALCH S75P: concentration 75 mass %) was added thereto to prepare an ALCH solution.

Ten grams of $(Ba_{0.65}, Sr_{0.35})_2SiO_4$:Eu particles (BSSE: manufactured by SUMITOMO METAL MINING CO., LTD., D50=27 μm) as phosphor particles and 3 g of the above-described aqueous strontium acetate solution were added to the ALCH solution and stirred at a temperature of 23° C. for 2 hours. It is to be noted that in this case, a mixed solution of the aqueous strontium acetate solution and the ALCH solution was a pretreatment solution and had a pH of 9.1. After the completion of stirring, the mixture was subjected to vacuum filtration to obtain phosphor particles of Sample 9 having a pretreatment film of an aluminum organic metal compound and a strontium compound on their surface.

(Sample 10)

Fifty grams of strontium acetate (manufactured by KANTO CHEMICAL CO., INC., special grade chemical) and 150 g of barium chloride (manufactured by KANTO CHEMICAL CO., INC., special grade chemical) were added to and dissolved in 800 g of pure water with stirring to prepare an aqueous solution with a total concentration of strontium acetate and barium chloride of 20% by mass. Phosphor particles of Sample 10 having a pretreatment film of an aluminum organic metal compound and a strontium compound on their surface were obtained in the same manner as in the case of Sample 9 except that the above-described aqueous solution was used instead of the aqueous strontium acetate solution.

(Sample 11)

One hundred grams of strontium chloride (manufactured by KANTO CHEMICAL CO., INC., special grade chemical) was added to and dissolved in 900 g of pure water with stirring to prepare a 10% by mass aqueous strontium chloride solution. Phosphor particles of Sample 11 having a pretreatment film of an aluminum organic metal compound and a strontium compound on their surface were obtained in the same manner as in the case of Sample 9 except that the above-described aqueous solution was used instead of the aqueous strontium acetate solution.

(Samples 12 to 14)

Phosphor particles of Samples 12 to 14 having a pretreatment film of a strontium compound formed on their surface were obtained in the same manner as in the case of Sample 1 except that $(Sr_{0.51}, Ca_{0.49})_2SiO_4$:Eu particles (CSSE: manufactured by SUMITOMO METAL MINING CO., LTD., D50=17 μm) were used as phosphor particles and that an aqueous strontium acetate solution with a concentration of 10% by mass, an aqueous strontium chloride solution with a concentration of 10% by mass, and an aqueous strontium acetate solution with a concentration of 0.5% by mass were used for Sample 12, Sample 13, and Sample 14, respectively. The thus prepared phosphor particles of Samples 1 to 14 and the composition and pH of the pretreatment solutions are shown in the following Table 1.

TABLE 1

| Sample | Phosphor particles | Composition of pretreatment solution | pH of pretreatment solution |
|---|---|---|---|
| 1 | SEE | Sr acetate: 2% | 7.1 |
| 2 | SEE | Sr acetate: 10% | 6.6 |
| 3 | SEE | Sr acetate: 15% | 6.2 |
| 4 | SEE | Sr acetate: 20% | 6.0 |
| 5 | SBSE | Sr acetate: 9% + Ba chloride: 1% | 6.4 |

TABLE 1-continued

| Sample | Phosphor particles | Composition of pretreatment solution | pH of pretreatment solution |
|---|---|---|---|
| 6 | SBSE | Sr acetate: 1% + Ba chloride: 9% | 6.1 |
| 7 | BSSE | Sr acetate: 10% | 6.6 |
| 8 | BSSE | Sr chloride: 10% | 6.1 |
| 9 | BSSE | Sr acetate: 10% + ALCH | 9.1 |
| 10 | BSSE | Sr acetate: 5% + Ba chloride: 15% + ALCH | 8.9 |
| 11 | BSSE | Sr chloride: 10% + ALCH | 8.2 |
| 12 | CSSE | Sr acetate: 10% | 6.6 |
| 13 | CSSE | Sr chloride: 10% | 6.1 |
| *14 | CSSE | Sr acetate: 0.5% | 7.2 |

(Note)
The sample marked with * in the table indicates Comparative Example.

Some of the phosphor particles having a pretreatment film of each of Samples 1 to 14 were sampled and dried by heating at a temperature of 110° C. for 1 hour. Then, the phosphor particles of Samples 1 to 8 and 12 to 14 and the other phosphor particles of Samples 9 to 11 were heat-treated at a temperature of 300° C. and 200° C., respectively, for 1 hour. The thickness of the surface pretreatment film, water resistance (electric conductivity change), and light-emitting characteristics before and after pretreatment were determined for the thus dried and heat-treated phosphor particles having a pretreatment film of each of Samples 1 to 14. The results are shown in the following Table 2.

TABLE 2

| Sample | Light-emitting characteristics (Relative value) | | | Film thickness | Electric conductivity |
|---|---|---|---|---|---|
| | Abs. | EQE | IQE | (nm) | change (μS/cm) |
| 1 | 1.005 | 1.006 | 1.005 | <10 | 238 |
| 2 | 1.022 | 1.031 | 1.029 | 10 | 166 |
| 3 | 1.018 | 1.028 | 1.026 | 10 | 147 |
| 4 | 1.014 | 1.021 | 1.018 | 10 | 132 |
| 5 | 1.018 | 1.022 | 1.021 | 10 | 151 |
| 6 | 1.022 | 1.028 | 1.027 | 20 | 121 |
| 7 | 1.007 | 1.046 | 1.039 | 10 | 350 |
| 8 | 1.014 | 1.042 | 1.036 | 10 | 273 |
| 9 | 1.022 | 1.037 | 1.028 | 20 | 208 |
| 10 | 1.017 | 1.026 | 1.025 | 30 | 187 |
| 11 | 1.014 | 1.038 | 1.033 | 20 | 191 |
| 12 | 1.016 | 1.022 | 1.019 | 10 | 172 |
| 13 | 1.013 | 1.021 | 1.018 | 10 | 176 |
| *14 | 0.998 | 0.999 | 0.998 | <10 | 389 |

(Note)
The sample marked with * in the table indicates Comparative Example.

Then, the phosphor particles having a pretreatment film of Samples 2, 5, 8, 9, 12, and 14 out of the phosphor particles having a pretreatment film of Samples 1 to 14 prepared in such a manner as described above were treated to coat them with second and third layers. More specifically, 2 g of the phosphor particles of each of the five kinds of Samples was added to 40 g of isopropyl alcohol (IPA: manufactured by KANTO CHEMICAL CO., INC., first grade chemical). To this solution, 2 g of ethylacetoacetate aluminum diisopropylate (manufactured by Kawaken Fine Chemicals Co., Ltd., ALCH S75P: concentration 75 mass %) was further added, and then 0.6 g of water for hydrolysis was added thereto and mixed with stirring at 25° C. for 2 hours. Then, the phosphor particles having an aluminum organic metal compound layer as a base layer were collected by vacuum filtration.

Two grams of the obtained phosphor particles having an aluminum organic metal compound layer was added to 10 g of ethanol (manufactured by KANTO CHEMICAL CO., INC., special grade chemical), and 7.5 g of a previously-prepared silane hydrolysis condensate (coating material) was added thereto and mixed with stirring at a temperature of 25° C. for 1 hour. Then, the phosphor particles having a silane organic metal compound layer were collected by vacuum filtration.

The thus obtained phosphor particles of each of the five kinds of Samples were dried by heating at a temperature of 110° C. for 1 hour and then heat-treated at a temperature of 300° C. for 1 hour to obtain phosphor particles having a coating film. The thickness of the surface coating film, water resistance (electric conductivity change), and light-emitting characteristics before and after coating treatment were determined for the phosphor particles of each of Samples. Further, a change in emission intensity before and after the moisture resistance test was determined to evaluate moisture resistance. The results are shown in the following Table 3.

TABLE 3

| Sample | Light-emitting characteristics (Relative value) | | | Film thickness | Electric conductivity change | Emission intensity after moisture |
|---|---|---|---|---|---|---|
| | Abs. | EQE | IQE | (nm) | (μS/cm) | resistance test |
| 2 | 1.024 | 1.029 | 1.028 | 100 | 21 | 0.93 |
| 5 | 1.017 | 1.026 | 1.026 | 80 | 17 | 0.92 |
| 8 | 1.021 | 1.039 | 1.034 | 80 | 11 | 0.96 |
| 9 | 1.026 | 1.034 | 1.031 | 90 | 13 | 0.97 |
| 12 | 1.021 | 1.026 | 1.025 | 100 | 18 | 0.93 |
| *14 | 1.002 | 1.001 | 1.002 | 90 | 28 | 0.92 |

(Note)
The sample marked with * in the table indicates Comparative Example.

COMPARATIVE EXAMPLE

Ten grams of $Sr_3SiO_5$:Eu particles (manufactured by TOKYO KAGAKU KENKYUSHO CO., LTD., D50=19 μm) as phosphor particles was directly dried by heating at a temperature of 110° C. for 1 hour, and was then heat-treated at a temperature of 300° C. for 1 hour to obtain uncoated phosphor particles of Sample 15. Uncoated phosphor particles of Sample 16 were obtained in the same manner as described above with reference to Sample 15 except that $(Sr_{0.95}, Ba_{0.05})_3SiO_5$:Eu particles (manufactured by TOKYO KAGAKU KENKYUSHO CO., LTD., D50=22 μm) were used as phosphor particles. Uncoated phosphor particles of Sample 17 were obtained in the same manner as described above with reference to Sample 15 except that $(Ba_{0.65}, Sr_{0.35})_2SiO_4$:Eu particles (manufactured by SUMITOMO METAL MINING CO., LTD., D50=27 μm) were used as phosphor particles. Uncoated phosphor particles of Sample 18 were obtained in the same manner as described above with reference to Sample 15 except that $(Sr_{0.51}, Ca_{0.49})_2SiO_4$:Eu particles (CSSE: manufactured by SUMITOMO METAL MINING CO., LTD., D50=17 μm) were used as phosphor particles.

Ten grams of $Sr_3SiO_5$:Eu particles (manufactured by TOKYO KAGAKU KENKYUSHO CO., LTD., D50=19 μm) as phosphor particles was added to 100 g of pure water and stirred at a temperature of 23° C. for 2 hours. After the completion of stirring, the phosphor particles were collected by vacuum filtration, dried by heating at a temperature of 110° C. for 1 hour, and heat-treated at a temperature of 300° C. for 1 hour. In this way, water-treated phosphor particles of Sample 19 were obtained. Water-treated phosphor particles of Sample 20 were obtained in the same manner as described above with reference to Sample 19 except that (Sr$_{0.51}$, Ca$_{3.49}$)$_2$SiO$_4$:Eu particles (CSSE: manufactured by SUMITOMO METAL MINING CO., LTD., D50=17 μm) were used as phosphor particles.

Acetic acid was added to 100 g of pure water to adjust pH to 6. To this solution, 10 g of Sr$_3$SiO$_5$:Eu particles (manufactured by TOKYO KAGAKU KENKYUSHO CO., LTD., D50=19 μm) as phosphor particles was added and stirred at a temperature of 23° C. for 2 hours. After the completion of stirring, the phosphor particles were collected by vacuum filtration, dried by heating at a temperature of 110° C. for 1 hour, and heat-treated at a temperature of 300° C. for 1 hour. In this way, phosphor particles of Sample 21 treated with an aqueous acetic acid solution were obtained.

Ammonia water was added to 100 g of pure water to adjust pH to 10. To this solution, 10 g of Sr$_3$SiO$_5$:Eu particles (manufactured by TOKYO KAGAKU KENKYUSHO CO., LTD., D50=19 μm) as phosphor particles was added and stirred at a temperature of 23° C. for 2 hours. After the completion of stirring, the phosphor particles were collected by vacuum filtration, dried by heating at a temperature of 110° C. for 1 hour, and heat-treated at a temperature of 300° C. for 1 hour. In this way, phosphor particles of Sample 22 treated with ammonia water were obtained.

Water resistance (electric conductivity change) and light-emitting characteristics before and after coating treatment were determined for the phosphor particles of each of Samples 15 to 22 treated by the above various methods. Further, a change in emission intensity before and after the moisture resistance test was determined (for only Samples 15 to 18) to evaluate moisture resistance. The results are shown in the following Table 4.

TABLE 4

| Sample | Treatment | Light-emitting characteristics (Relative value) | | | Electric conductivity change (μS/cm) | Emission intensity after moisture resistance test |
| --- | --- | --- | --- | --- | --- | --- |
| | | Abs. | EQE | IQE | | |
| *15 | Uncoated | 1.000 | 1.000 | 1.000 | 2230 | 0.64 |
| *16 | Uncoated | 1.000 | 1.000 | 1.000 | 1040 | 0.71 |
| *17 | Uncoated | 1.000 | 1.000 | 1.000 | 580 | 0.84 |
| *18 | Uncoated | 1.000 | 1.000 | 1.000 | 1470 | 0.69 |
| *19 | Water | 0.976 | 0.938 | 0.951 | 723 | — |
| *20 | Water | 0.964 | 0.932 | 0.941 | 652 | — |
| *21 | Acetic acid | 0.971 | 0.961 | 0.967 | 1124 | — |
| *22 | Ammonia water | 0.998 | 0.992 | 0.993 | 1897 | — |

(Note)
The samples marked with * in the table indicate Comparative Example.

As can be seen from the results shown in Tables 3 and 4, all the film-coated phosphor particles of Example according to the present invention are much smaller in electric conductivity change as compared to the uncoated phosphor particles of Comparative Example, and have improved in emission intensity after moisture resistance test. From this, it is apparent that high moisture resistance and water resistance can be obtained by coating. Further, the film-coated phosphor particles of Example according to the present invention clearly have improved light-emitting characteristics.

On the other hand, as can be seen from the results of Samples 19 to 22 of Comparative Example, light-emitting characteristics are not improved even by treatment with a pretreatment solution containing no Sr ions. Further, as can be seen from the results of Sample 14 shown in Table 3, when pretreatment is performed using a pretreatment solution whose composition is outside the range of the present invention before coating treatment with second and third layers, moisture resistance can be improved but light-emitting characteristics are not improved to a desired level.

The invention claimed is:

1. A method for producing film-coated alkaline-earth metal silicate phosphor particles, the method comprising the steps of:
forming a first coating layer on a plurality of starter particles by treating the starter particles with an alkaline-earth metal compound solution;
forming a second coating layer on the starter particles which have been coated with the first coating layer;
forming a third coating layer on the starter particles which have been coated with the second coating layer; and
after forming the third coating layer, drying and heat-treating the coated starter particles;
wherein the starter particles are strontium-containing alkaline-earth metal silicate phosphor particles,
wherein the second coating layer contains an aluminum organic metal compound,
wherein the third coating layer contains a partially-hydrolyzed condensate of a silane organic metal compound,
wherein the alkaline-earth metal compound solution contains at least 1 to 15% by mass of a strontium compound with respect to the starter particles and having a pH inclusively between 6 and 10.

2. The method for producing film-coated alkaline-earth metal silicate phosphor particles according to claim 1, wherein the strontium compound contained in the alkaline-earth metal compound solution is at least one selected from strontium acetate and strontium chloride.

3. The method for producing film-coated alkaline-earth metal silicate phosphor particles according to claim 1, wherein the alkaline-earth metal compound solution contains 2 to 100% by mass of an aluminum organic metal compound with respect to the starter particles.

4. The method for producing film-coated alkaline-earth metal silicate phosphor particles according to claim 1, wherein the first coating layer is formed by adding and mixing the starter particles to and with the alkaline-earth metal compound solution with stirring at a temperature of 18 to 60° C. for 1 to 24 hours.

5. The method for producing film-coated alkaline-earth metal silicate phosphor particles according to claim 1, wherein each of the starter particles further comprises at least one metal selected from barium and calcium.

6. The method for producing film-coated alkaline-earth metal silicate phosphor particles according to claim 1,
wherein the alkaline-earth metal silicate phosphor in the starter particles is one selected from the group consisting of Sr$_3$SiO$_5$:Eu, (Sr$_a$Ba$_b$Ca$_c$)$_3$SiO$_5$:Eu, (Sr$_w$Ba$_x$Ca$_y$Mg$_z$)$_2$SiO$_4$:Eu, and
wherein $0.9 \leq a \leq 1.0$, $0 \leq b \leq 0.05$, $0 \leq c \leq 0.05$, $0 < w \leq 0.7$, $0 \leq x \leq 0.7$, $0 \leq y \leq 0.7$, and $0 \leq z \leq 0.5$.

* * * * *